United States Patent Office.

FRITZ BENDER, OF MÜHLHEIM, HESSE, GERMANY, ASSIGNOR TO A. LEONHARDT & CO., OF SAME PLACE.

PRODUCTION OF YELLOW AZO COLORING-MATTER.

SPECIFICATION forming part of Letters Patent No. 341,991, dated May 18, 1886.

Application filed October 5, 1885. Serial No. 179,041. (Specimens.)

*To all whom it may concern:*

Be it known that I, FRITZ BENDER, doctor of philosophy, a citizen of Germany, and residing at Mühlheim, in the Grand Duchy of Hesse, Germany, have invented a new and useful Improvement in Coloring-Matter, of which the following is a specification.

From diazo-benzol and metaphenylene diamine is obtained, as is known, a coloring-matter termed "chrysoidine." If the diazo body is replaced by its nitrated substitution products, nitrated derivatives of a basic nature are produced which will color silk, wool, and cotton yellow or brown, and especially with metanitraniline is obtained a coloring-matter, the coloring effect of which upon wool, cotton, silk, and the like differs little from that of the phosphines. The coloring-matter thus produced is my invention, and I will now proceed to describe particularly the method of its production. Thirteen and eight-tenths kilograms of metanitraniline is dissolved in diluted hydrochloric acid and diazotized by the addition of the requisite quantity of a solution of nitrite. The product of reaction is poured after standing for some time into an aqueous solution of eighteen kilograms of hydrochloric metaphenylene diamine. The coloring-matter is produced immediately, and is purified by repeated dissolving and crystallizing out. If the sulpho-acid of this coloring-matter is to be obtained, it is preferable to take in place of the metanitraniline its sulpho-acid.

My coloring-matter is in the form of a brown red powder, which is hardly soluble in cold water, somewhat more so in hot, and dissolves in alcohol, giving a red yellow color. The hot saturated water solution treated with acid congeals to a red jelly upon cooling. A large quantity of water partly dissociates the coloring-matter, so that on cooling quietly the free bases crystallize. This is, however, more easily obtained through precipitation with ammonia; it crystallizes out of watery alcohol into needles and melts at 204°.

My new coloring-matter is easily dissolved in fuming sulphuric acid and nitric acid of 1.385 specific gravity, producing a red yellow color. It can be reduced by zinc-dust, hydrochloric acid, as well as by chloruret of tin in hydrochloric-acid solution. If the colorless reduction-fluid is treated with chloride of iron, a variable red color is obtained.

Having thus described my invention and the manner of employing the same, I claim and wish to have secured to me by Letters Patent of the United States of America—

1. The production of a yellow coloring-matter by the action of diazotized metanitraniline or its sulpho-acids upon phenylene diamine, substantially as above set forth.

2. The yellow coloring-matter herein described, having the properties of being hardly soluble in cold water, somewhat more so in hot water, but soluble in alcohol, sulphuric and nitric acid, as herein set forth.

In testimony whereof I have signed my name to this specification in the presence of two subscribing witnesses.

FRITZ BENDER.

Witnesses:
 FRANZ WIRTH,
 FRANZ HASSLACHER.